(12) United States Patent
Wittenberg et al.

(10) Patent No.: US 8,192,234 B2
(45) Date of Patent: Jun. 5, 2012

(54) AUDIO CONNECTOR CONTROL SYSTEM

(75) Inventors: Michael B. Wittenberg, Mountain View, CA (US); Scott Myers, San Francisco, CA (US); Parin Patel, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 103 days.

(21) Appl. No.: 12/793,644

(22) Filed: Jun. 3, 2010

(65) Prior Publication Data

US 2011/0300751 A1 Dec. 8, 2011

(51) Int. Cl.
*H01R 13/66* (2006.01)

(52) U.S. Cl. .................................. 439/620.21

(58) Field of Classification Search .................. 439/825, 439/620.21, 620.23, 668, 669
See application file for complete search history.

(56) References Cited

U.S. PATENT DOCUMENTS

| 4,384,183 A | 5/1983 | Meshoulam |
| 5,431,585 A | 7/1995 | Fan |
| 5,569,872 A * | 10/1996 | Gimpel ........................... 84/728 |
| 7,800,360 B2 * | 9/2010 | Johansson et al. ........ 324/207.25 |
| 2008/0247592 A1 | 10/2008 | Kourzanov |
| 2009/0107827 A1 | 4/2009 | Hansson et al. |

FOREIGN PATENT DOCUMENTS

| JP | 2004014391 A | 1/2004 |
| WO | 2007/049175 | 5/2007 |

* cited by examiner

*Primary Examiner* — Javaid Nasri
(74) *Attorney, Agent, or Firm* — Treyz Law Group; G. Victor Treyz; Jason Tsai

(57) ABSTRACT

An electronic device such as a portable music player, cellular telephone, or computer may be provided with an audio jack system that allows audio plug position measurements to be made. Sensors such as optical sensors, magnetic sensors, mechanical sensors, electrical sensors, resistive sensors, and capacitive sensors may be used in monitoring the position and movement of the audio plug relative to the audio jack. A user may rotate the audio plug to control operations such as media playback operations, menu selection operations, and other activities in the electronic device. The audio jack may include flexible structures that allow the audio plug to be tilted relative to the audio jack. Capacitive sensors or other sensors may be used to monitor audio plug tilt and axial audio plug movement. This allows the audio plug to serve as a joystick for the electronic device.

19 Claims, 11 Drawing Sheets

AUDIO CONNECTOR CONTROL SYSTEM

BACKGROUND

This relates to control systems, and, more particularly, to control systems that allow a user to issue commands for an electronic device by manipulating an audio connector.

Electronic devices such as media players, cellular telephones, computers, and other electronic equipment often contain audio jacks. Accessories such as headsets have mating plugs. A user who desires to use a headset with an electronic device may connect the headset to the electronic device by inserting the headset plug into the mating audio jack on the electronic device. Miniature size (3.5 mm) phone jacks and plugs are commonly used in electronic devices such as notebook computers and media players, because audio connectors such as these are relatively compact.

Particularly in compact electronic devices, there is a desire to minimize the amount of space that is consumed by user interface equipment. For example, it may desirable to eliminate all but the most significant buttons and input-output ports in a compact media player. Sometimes this means eliminating buttons and controls that might be helpful to a user, but that simply will not fit within the allotted volume for the device. A designer of an electronic device is therefore often faced with competing concerns. Useful buttons and other user interface components should be included in a device to provide the user of the device with ways in which to control device operation. At the same time, space should be conserved by minimizing the number of controls that are included. Significant design compromises must often be made.

It would therefore be desirable to be able to provide improved ways in which to control an electronic device such as control schemes that have a minimized impact on device size.

SUMMARY

An electronic device such as a portable music player, cellular telephone, or computer may be provided with an audio jack that receives an audio plug. Audio plugs may be used in headphones and other audio accessories. When an audio plug is inserted into an audio jack, contacts in the audio plug mate with contacts in the audio jack. This allows electrical signals such as power and audio signals to be passed between the accessory and electronic device to which the accessory is attached.

User input for controlling an electronic device may be gathered using buttons and other user input interface devices. Audio connectors such as jacks and plugs may also be provided with sensors that allow the audio connectors to serve as a type of user input device. For example, rotation sensors may be used to detect rotation of an audio plug within a jack. Sensors may also be used to detect axial movement of an audio plug along the longitudinal axis of the audio jack or tilting movement of the audio plug relative to the jack. By processing data from these audio connector sensors, user manipulation of the position of the audio plug relative to the audio jack can serve as user input.

Sensors such as optical sensors, magnetic sensors, mechanical sensors, electrical sensors, resistive sensors, and capacitive sensors may be used in monitoring the position and movement of the audio plug relative to the audio jack. A user may rotate the audio plug to control operations such as media playback operations, menu selection operations, and other activities in the electronic device. The audio jack may include flexible structures that allow the audio plug to be tilted relative to the audio jack. The flexible structures can form part of a resistive sensor or other position sensor. Capacitive sensors or other sensors may be used to monitor audio plug tilt and axial audio plug movement. Sensors such that detect tilt and axial movement can be used to allow the audio plug to serve as a joystick for the electronic device.

Further features of the invention, its nature and various advantages will be more apparent from the accompanying drawings and the following detailed description of the preferred embodiments.

DETAILED DESCRIPTION

This relates to control systems such as control systems for electronic devices. The electronic devices in which the control systems are used may be computers, media players, handheld devices, cellular telephones, laptop computers, tablet computers, other portable electronic devices, or other electronic equipment. Arrangements in which the control systems are used in connection with portable electronic devices such as media players and cellular telephones are sometimes described herein as an example. This is, however, merely illustrative. The control systems may be used in connection with any electronic equipment.

The control systems may allow a user to control an electronic device by manipulating the position of an audio plug within an audio jack in the electronic device. The audio plug may be associated with an accessory such as a headset. Movement of the audio plug relative to the electronic device may be detected using sensors. By detecting the position of the audio plug relative to the electronic device, some or all desired user interface operations may be implemented without using external buttons and other controls.

Figure 1A:
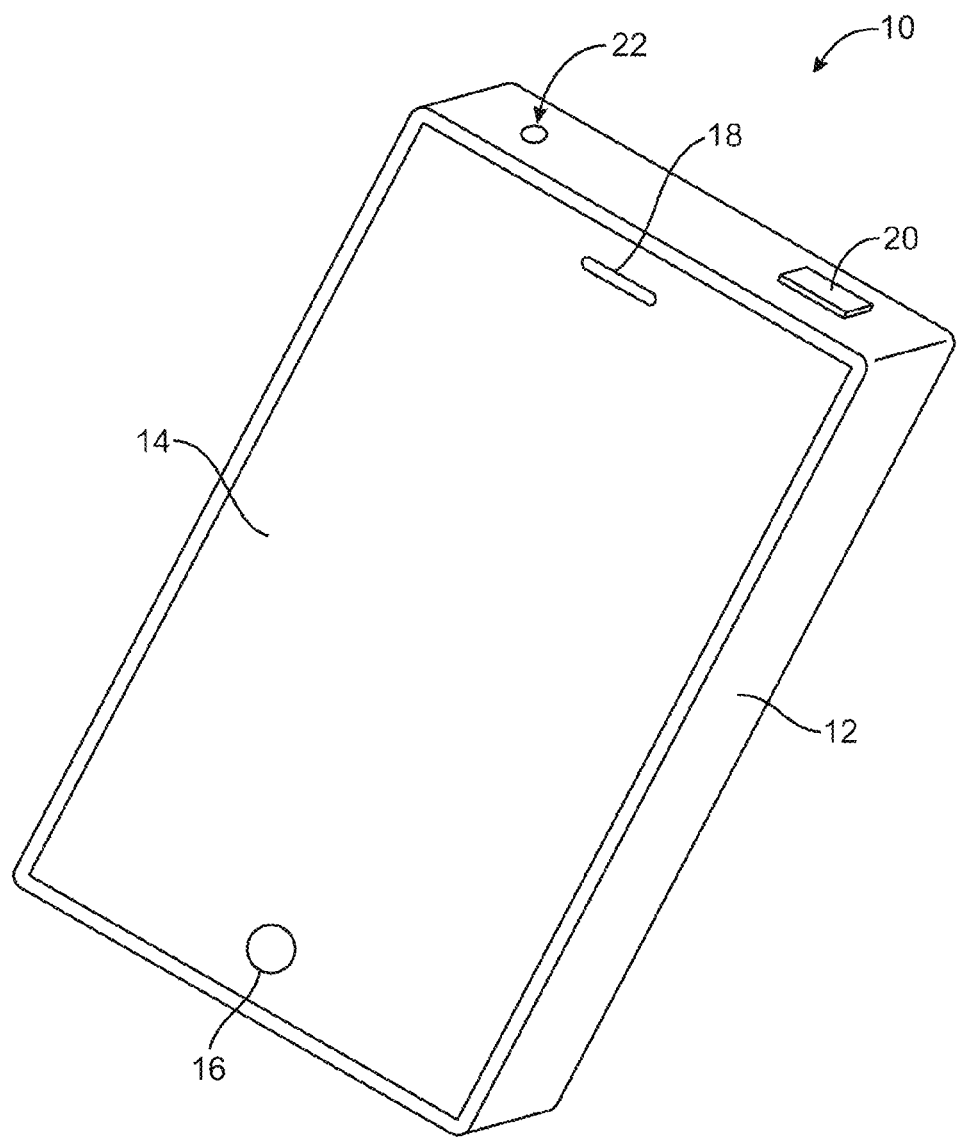
FIG. 1A is a perspective view of an illustrative electronic device that may be controlled using an audio connector control system in accordance with an embodiment of the present invention.

An illustrative electronic device that may include an audio connector control system is shown in FIG. 1A. As shown in FIG. 1A, device 10 includes housing 12. Housing 12, which is sometimes referred to as a case, may be formed of any suitable materials including, plastic, glass, ceramics, composites, metal, other suitable materials, or a combination of these materials. Housing 12 may be formed using a unibody construction technique in which most or all of housing 12 is formed from a single piece of material. Housing 12 may, for example, be formed from a piece of machined or cast aluminum or stainless steel. Housing 12 may also be formed from multiple smaller housing structures (i.e., frame structures, sidewalls, peripheral bands, bezels, etc.). Unibody housing structures and housing structures formed from multiple pieces may be formed from metal, plastic, composites, or other suitable materials.

Device 10 may have a display such as display 14. Display 14 may be a touch screen that incorporates capacitive touch electrodes or other touch sensitive elements. Display 14 may include image pixels formed form light-emitting diodes (LEDs), organic LEDs (OLEDs), plasma cells, electronic ink elements, liquid crystal display (LCD) components, or other suitable image pixel structures. A cover glass member may cover the surface of display 14. Buttons such as button 16 and speaker ports such as speaker port 18 may be formed in openings in the cover glass. Buttons and ports may also be formed in housing 12. For example, button 20 may be formed in housing 12 and audio port (audio jack) 22 may be formed in housing 12.

Figure 1B:
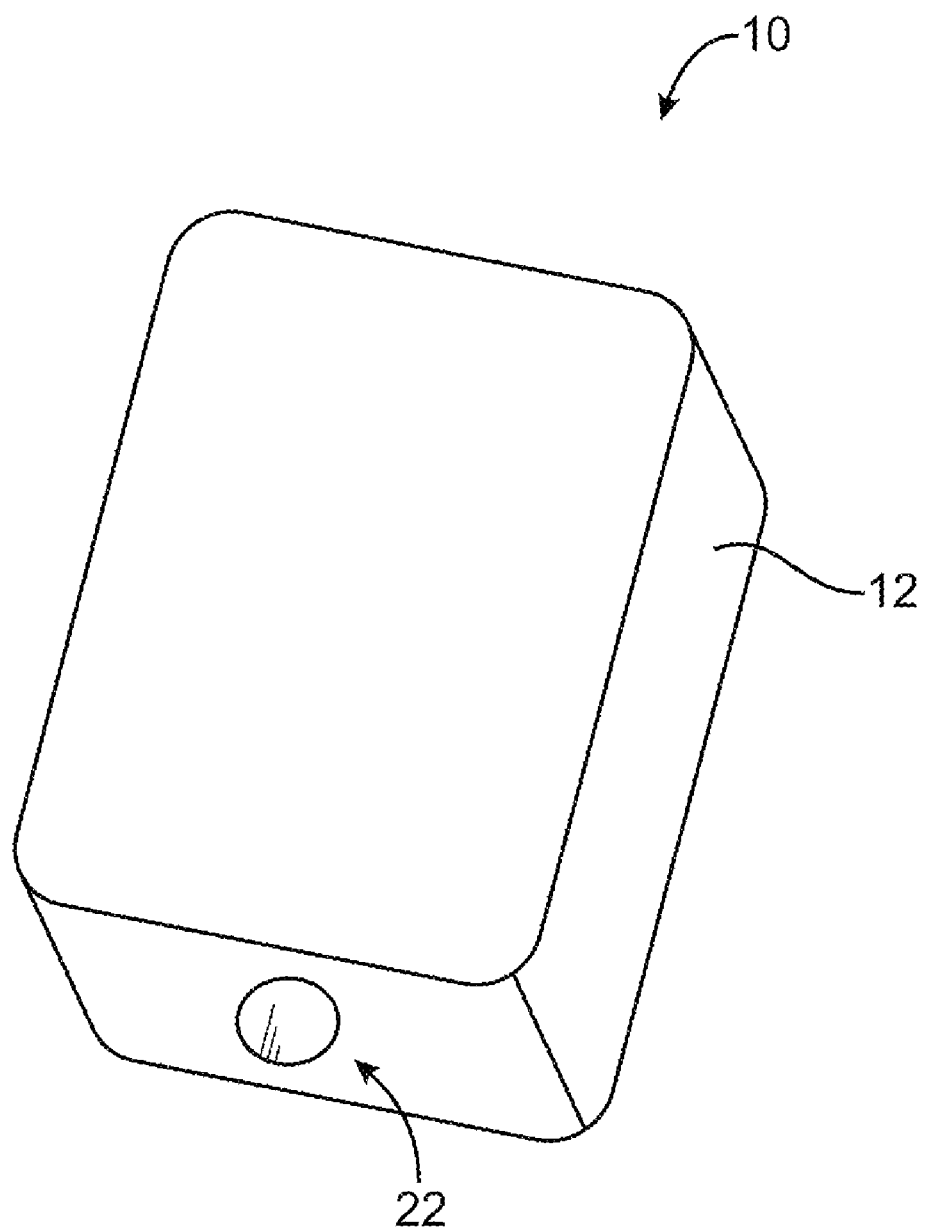
FIG. 1B is a perspective view of another illustrative electronic device that may be controlled using an audio connector control system in accordance with an embodiment of the present invention.

FIG. 1B is a diagram of another illustrative electronic device that may use a control system based on an audio connector. In the example of FIG. 1B, electronic device 10 has audio jack 22 mounted in housing 12, but has few or no other additional buttons or user interface components. The illustrative device of FIG. 1B does not have a display, but a display may be provided in a device of the type shown in FIG. 1B if desired.

In compact devices such as device 10 of FIG. 1A and device 10 of FIG. 1B, it may be desirable to minimize the amount of space consumed by buttons and other user interface devices. Because audio connector 22 is necessarily present in devices such as these (to support attachment of audio devices), there is little or no extra space requirement involved in using audio connector 22 as part of a user interface for controlling device 10.

In a typical arrangement, a user inserts an audio plug into audio jack 22. The audio plug may be associated with an accessory such as a headset. Once the audio plug has been inserted into audio jack 22, a user of device 10 may manipulate the position of the audio plug to control device 10.

Figure 2:
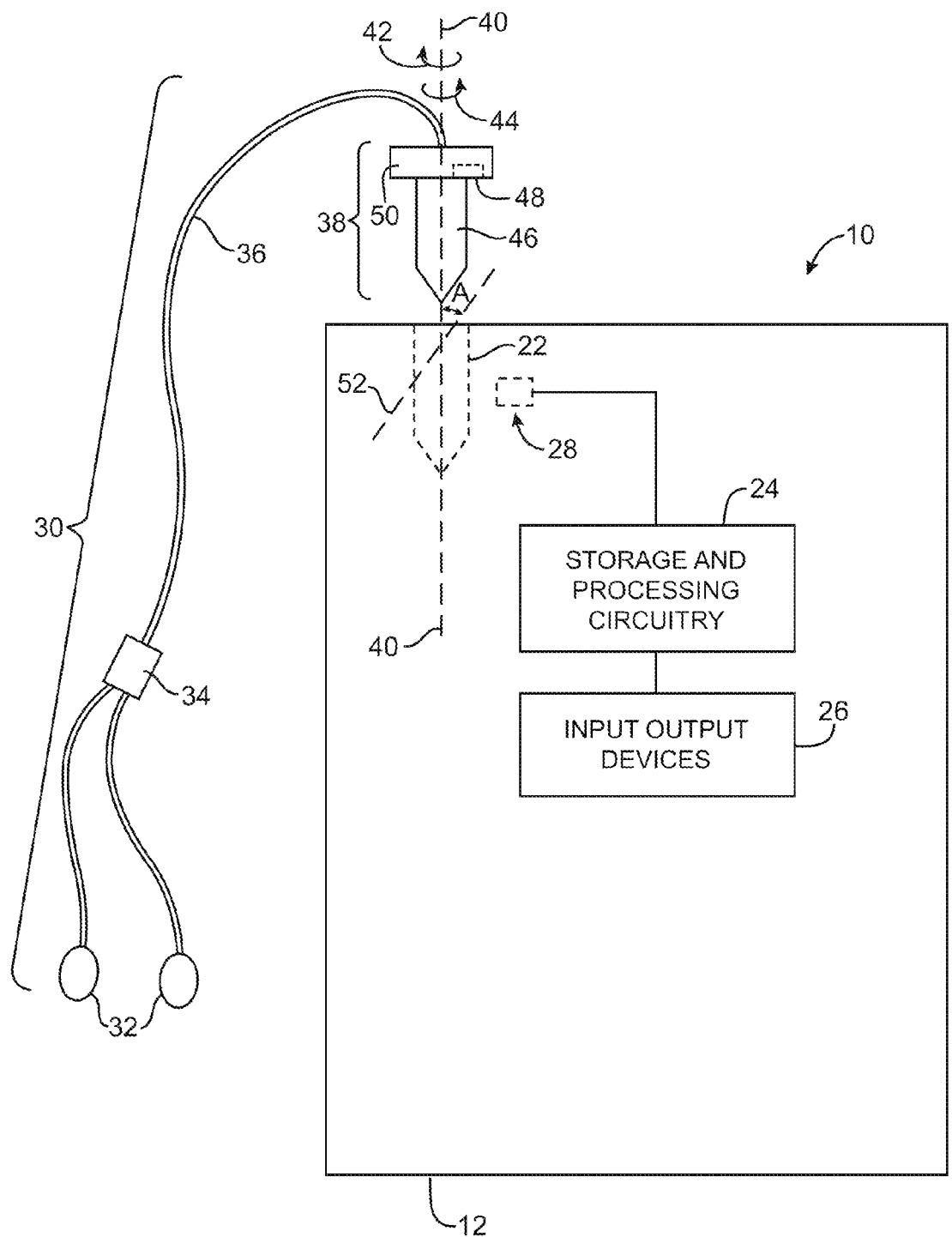
FIG. 2 is diagram showing how an electronic device may mate with a corresponding audio accessory using a pair of matching audio connectors in accordance with an embodiment of the present invention.

An illustrative arrangement of this type is shown in FIG. 2. As shown in FIG. 2, electronic device 10 may include an audio connector such as audio jack 22. Audio jack 22 may be, for example, a ⅛" jack. Accessory 30 may have a corresponding audio plug (i.e., a ⅛" plug) such as plug 38. When a user desires to connect accessory 30 to device 10, the user may insert plug 38 into jack 22.

In the FIG. 2 example, accessory 30 is a headset having speakers 32, microphone 34, and cable 36. Cable 36 and the other circuitry of accessory 30 may be coupled to device 10 when plug 38 is inserted into jack 22. Accessory 30 may, in general, be any device that has an associated audio connector (e.g., a set of speakers, an adapter, an extension cable, a peer device, an audio-video receiver, a television, or other consumer electronics equipment, a computer monitor, etc.). Popular device accessories include stereo headsets with microphones (e.g., for use with cellular telephones) and stereo headsets without microphones (e.g., for use with media players).

Electronic device 10 may have storage and processing circuitry 24. Storage and processing circuitry 24 may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in storage and processing circuitry 24 may be used to process sensor data and control the operation of device 10. This processing circuitry may be based on one or more microprocessors, microcontrollers, digital signal processors, applications specific integrated circuits, etc.

Storage and processing circuitry 24 may be used to run software on device 10, such as internet browsing applications, voice-over-internet-protocol (VOIP) telephone call applications, email applications, media playback applications, operating system functions, etc. To support interactions with external equipment, storage and processing circuitry 24 may be used in implementing communications protocols.

Input-output circuitry 26 may be used to allow data to be supplied to device 10 and to allow data to be provided from device 10 to external devices such as accessory 30. Input-output devices 26 may include touch screens, displays without touch capabilities, status indicator lights, buttons, joysticks, click wheels, scrolling wheels, touch pads, key pads, keyboards, microphones, cameras, speakers, input-output ports, etc. A user can control the operation of device 10 by supplying commands through such user input devices (if available). A user can also control the operation of device 10 by manipulating the position of plug 38 within jack 22.

Sensors may be used in determining the position of audio plug 38 relative to audio jack 22 (and therefore the position of audio plug 38 relative to device 10). The sensors that are used in determining the position of plug 38 may be included in device 10 (see, e.g., sensor 28). The sensors that are used in determining the position of plug 38 relative to jack 22 may also be located in audio plug 38 (e.g., in shaft 46 or on jacket 50, as shown by illustrative sensor 48 in FIG. 2). Signals from these sensors may be processed using processing circuitry in accessory 30 and/or processing circuitry in device 10 (e.g., storage and processing circuitry 24).

The position of audio plug 38 may be monitored in various dimensions. For example, the rotational orientation of plug 38 may be monitored. Jack 22 may have a longitudinal axis such as axis 40. When audio plug 38 is inserted into jack 22, audio plug 38 may be rotated in clockwise direction 42 and counterclockwise direction 44 relative to jack 22 and housing 12. Using sensors, the amount by which plug 38 has been rotated about rotational axis 40 can be determined.

If desired, jack 22 may be provided with flexible structures that allow plug 38 to tilt relative to axis 40. These flexible structures may include elastomeric structures, springs, hinges, pivots, or other structures. Plug 38 may have a longitudinal axis. When plug 38 is tilted, the longitudinal axis of plug 38 may tilt relative to longitudinal axis 40 of audio jack 22, as indicated by tilt angle A between axis 52 and axis 40 in FIG. 2. Sensors such as sensors 48 and 28 may be used in determining the value of angle A and the direction of tilt (i.e., the lateral direction in which the tip of plug 38 has been displaced relative to axis 40). Sensor signals from one or more sensors may be processed when determining the rotational orientation and tilt of plug 38.

Audio connectors such as plug 38 and jack 22 may contain any suitable number of contacts. Audio connectors that are commonly used for handling stereo audio have a tip connector, a ring connector, and a sleeve connector and are sometimes referred to as three-contact connectors or TRS connectors. In devices such as cellular telephones, it is often necessary to convey microphone signals from the headset to the cellular telephone. In arrangements in which it is desired to handle both stereo audio signals and microphone signals (e.g., in accessories such as accessory 30 of FIG. 2), an audio connector typically contains an additional ring terminal. Audio connectors such as these have a tip, two rings, and a sleeve and are therefore sometimes referred to as four-contact connectors or TRRS connectors.

Figure 10:
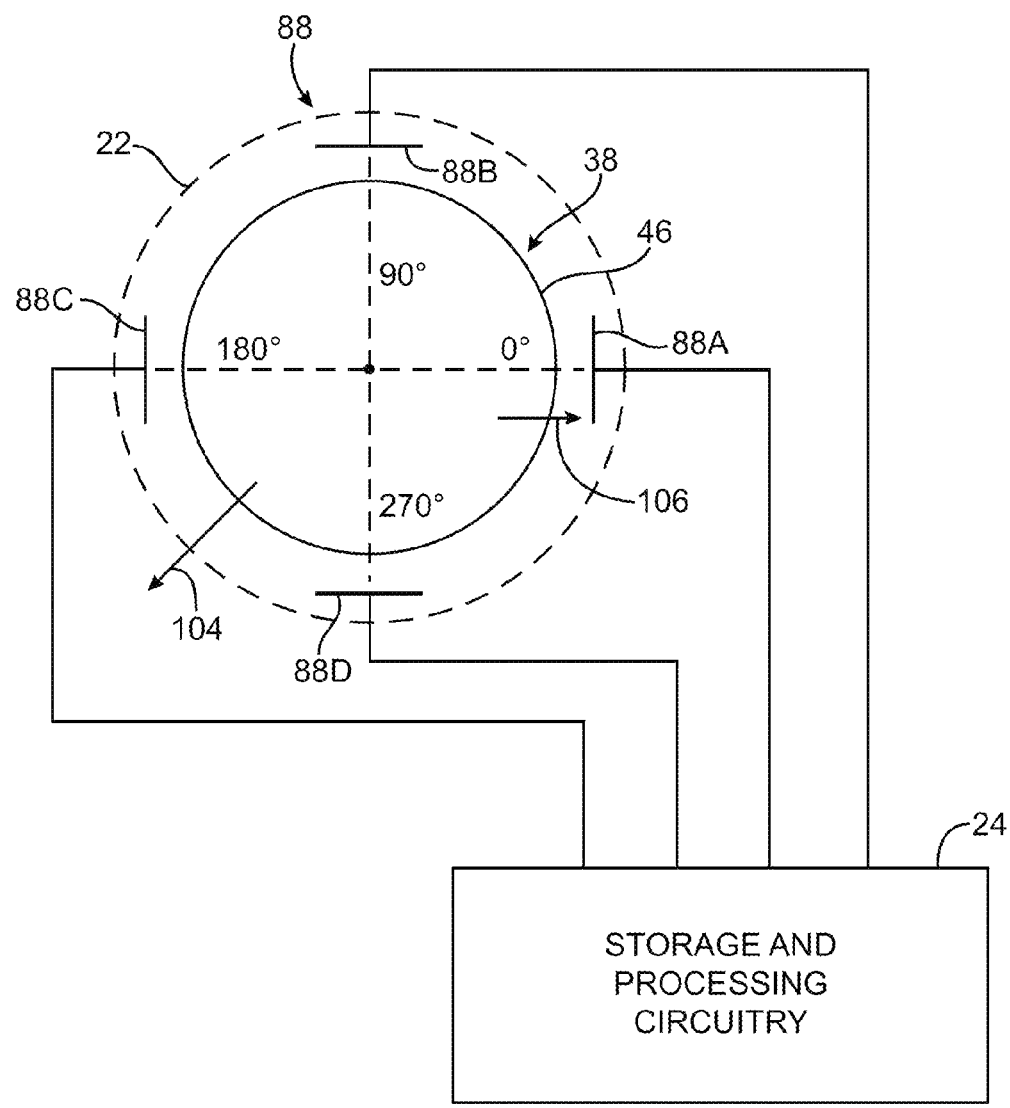
FIG. 10 is a top view of an illustrative audio plug and associated capacitive sensors for measuring off-axis tilt of the audio plug in accordance with an embodiment of the present invention.

A perspective view of a portion of device 10 in the vicinity of audio jack 22 is shown in FIG. 10. As shown in FIG. 10, audio jack 22 may contain electrical contacts T (tip), R1 (ring 1), R2 (ring 2), and S (sleeve). If desired, jack 22 may contain fewer contacts (e.g., two or three) or more contacts (e.g., five contacts or more than five contacts). Arrangements in which audio jack 22 has four contacts (i.e., four-contact audio connector arrangements such as the arrangement of FIG. 3) are sometimes described herein as an example.

When audio plug 38 is inserted into audio jack 22 along longitudinal axis 40, the contacts of audio jack 22 mate with corresponding audio contacts T, R1, R2, and S on shaft 46 of audio plug 38. One or more sensors in device 10 such as sensor(s) 28 may be used in monitoring the position of audio plug 38. One or more sensors (or sensor-related structures) on audio plug 38 may also (or alternatively) be used in monitoring the position of audio plug 38. Sensor structures in audio plug 38 may be located on jacket member (see, e.g., sensor 48A), on or under one of the contacts in plug 38 (see, e.g., sensor 48B), or within one or more of insulating rings 54 separating respective contacts in plug (see, e.g., sensor 48C). Contacts T, R1, R2, and S in jack 22 and plug 38 may be formed form conductive materials such as metal (e.g., stainless steel). Insulating rings 54 may be formed from a dielectric such as plastic, ceramic, glass, etc.

The position of audio plug 38 may be monitored using any suitable type of position sensor. Storage and processing circuitry 24 may be used in gathering and processing sensor signals. Storage and processing circuitry 24 may, in conjunction with input-output devices 26, take appropriate actions in response to measured positions. Examples of actions that may be taken in response to motion of audio plug 38 include changes to media playback volume, changes in media playback direction (e.g., forward or reverse), changes in channel (e.g., when tuning wireless channels), track changes (e.g., to advance to the next track in an album or to return to a previous track), or other suitable media playback commands. Other actions that can be taken include turning functions on an off, adjusting the levels of device settings, making menu selections, choosing which applications to launch, etc.

Figure 3:
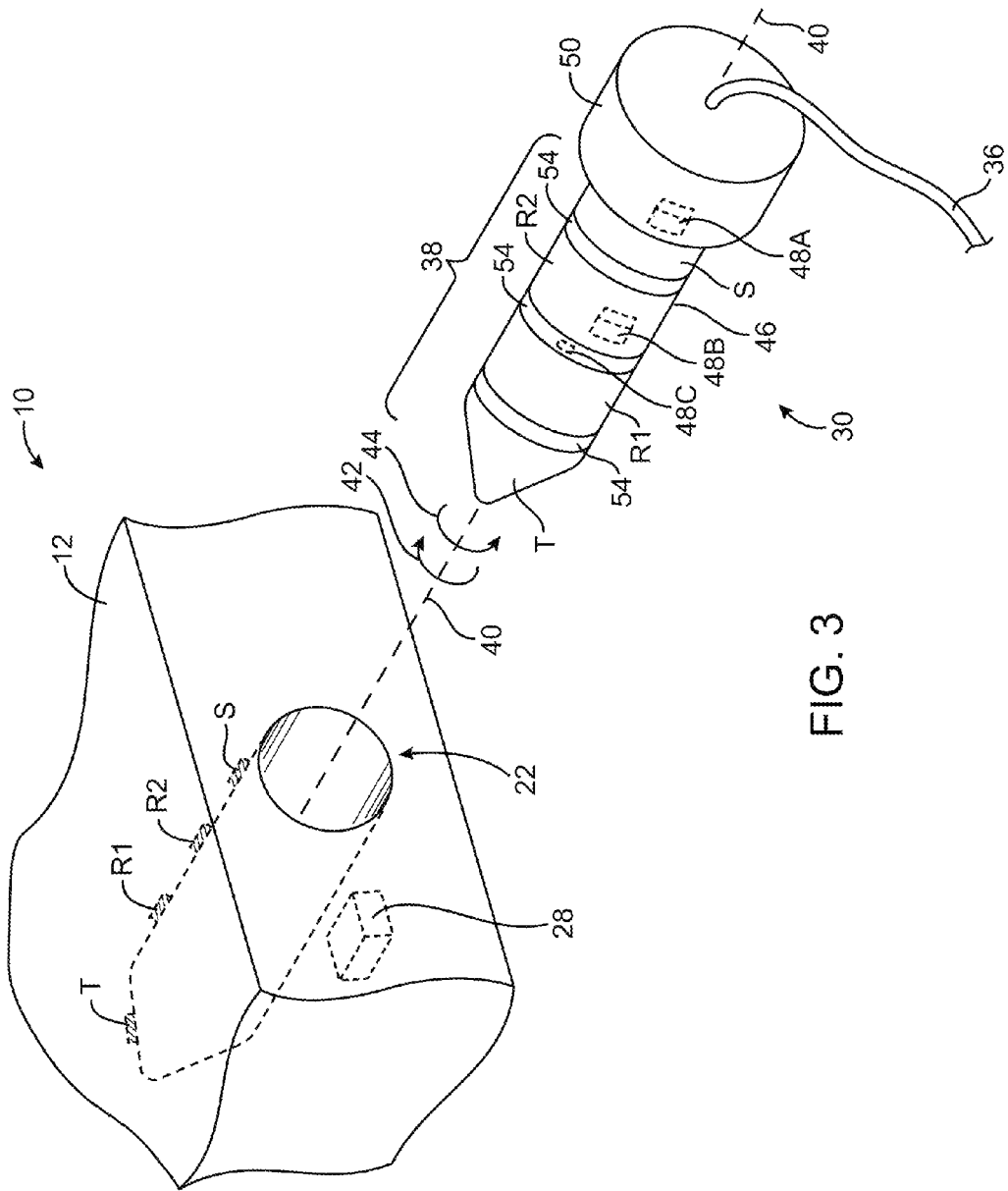
FIG. 3 is a perspective view of a portion of an electronic device and audio accessory showing how sensors may be used in monitoring the position of the audio accessory plug relative to the electronic device jack in accordance with an embodiment of the present invention.
Figure 4:
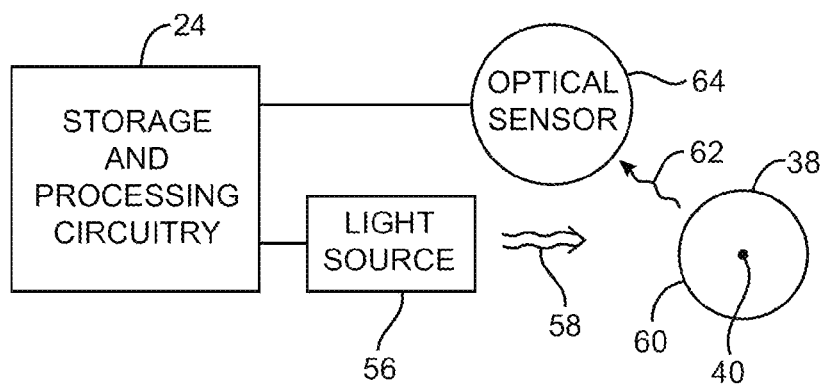
FIG. 4 is a cross-sectional side view of an illustrative optical sensor system that may be used in determining the position of an audio plug in accordance with an embodiment of the present invention.

FIG. 4 shows how the position of audio plug 38 may be monitored using an optical sensor system. In the arrangement of FIG. 4, light source 56 produces light 58. Light source 56 may be a laser or light-emitting diode. Light 58 may be directed onto a textured portion of audio plug 38, such as one or more of insulating rings 54 (FIG. 3). As audio plug 38 rotates about longitudinal axis 40, the pattern of reflected light from plug 38 (shown as light 62 in FIG. 4) may be detected by optical sensor 64. The signal from optical sensor 64 may be converted into position information by storage and processing circuitry 24.

Figure 5:
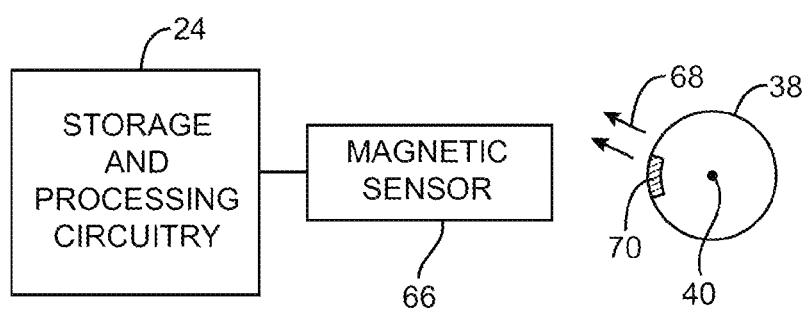
FIG. 5 is a cross-sectional side view of an illustrative magnetic sensor system that may be used in determining the position of an audio plug in accordance with an embodiment of the present invention.

As shown in the illustrative arrangement of FIG. 5, the position of audio plug 38 may be monitored by using a magnetic sensor such as magnetic sensor 66 to detect magnetic fields 68 that are associated with audio plug 38. Signals from magnetic sensor 66 may be gathered and processed by storage and processing circuitry 24. Sensor 66 may be an anisotropic magnetoresistance (AMR) sensor of the type that is sometimes referred to as a compass in applications where the detected magnetic field is the earth's magnetic field. If desired, other magnetic sensor technologies may be used to implement sensor 66 (e.g., Hall effect sensors).

The magnetic field that is detected by sensor 66 may be produced by one or more permanent magnets such as magnet 70 that are embedded within audio plug 38. To ensure backwards compatibility with audio plugs that do not include magnets (magnetless audio plugs), it may be desirable to use sensor 66 to detect parasitic magnetic fields of the type that are sometimes associated with trace magnetism in audio plug 38 or magnetic fields produced when current runs through audio plug 38. Sensitive electronic compasses such as anisotropic magnetoresistance sensors and other magnetic sensors can detect small magnetic fields and are able to detect the rotation of audio plug 38 about axis 40 even in the absence of magnet 70. The ability to measure the rotational orientation and movement of audio plug 38 magnetically without requiring that audio plug 38 include special magnets, electrical contacts, mechanical registration marks, or other special structures may be advantageous in environments in which compatibility with legacy equipment is desired. Magnetic sensors can, for example, measure rotational motion in magnetless audio plugs such as conventional TRRS plugs. One or more magnetic sensors (e.g., electric compasses) may be placed in the vicinity of audio plug 38 to measure magnetic fields from the audio plug if desired.

Figure 6:
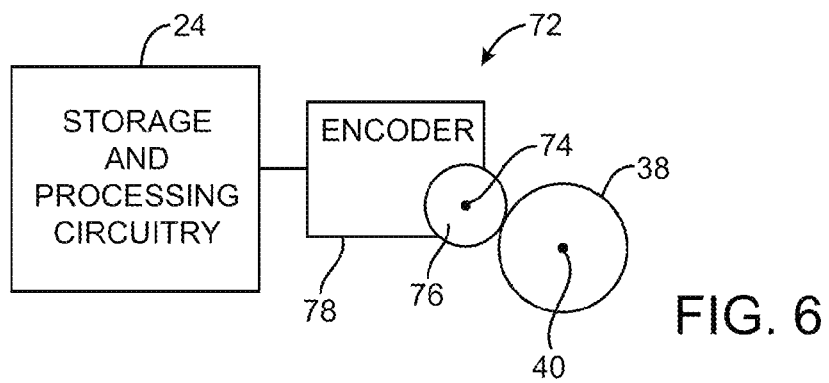
FIG. 6 is a cross-sectional side view of an illustrative mechanical sensor system that may be used in determining the position of an audio plug in accordance with an embodiment of the present invention.

FIG. 6 shows how the position of audio plug 38 may be monitored using a mechanical position sensor. Mechanical sensor 72 may include a rotating wheel such as wheel 76. Wheel 76 may be supported by a shaft such as shaft 74. The outer surface of wheel 76 may contact the outer surface of audio plug 38. As audio plug 38 rotates about axis 40, wheel 76 rotates proportionally around shaft 74. Encoder 78 detects the position of shaft 74 and generates a corresponding output. Storage and processing circuitry 24 may receive and process the output from encoder 78 to determine the position of audio plug 38.

Figure 7:
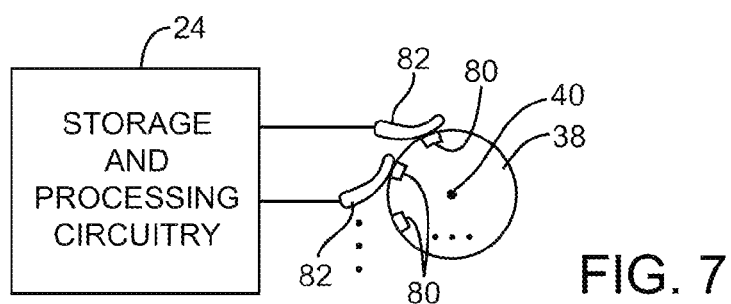
FIG. 7 is a cross-sectional side view of an illustrative electrical contact sensor system that may be used in determining the position of an audio plug in accordance with an embodiment of the present invention.

In the illustrative configuration of FIG. 7, audio plug 38 has electrical contacts 82. Contacts 82 may be distributed at different respective angular positions around the circumference of audio plug 38. When audio plug 38 is rotated, contacts 82 come into contact with springs 82 or other electrical contacts. Springs 82 may be mounted at fixed positions within audio jack 22, so movement of audio plug 38 can be detected by monitoring the way in which contacts 80 form open and closed circuit paths with springs 82.

Figure 8:
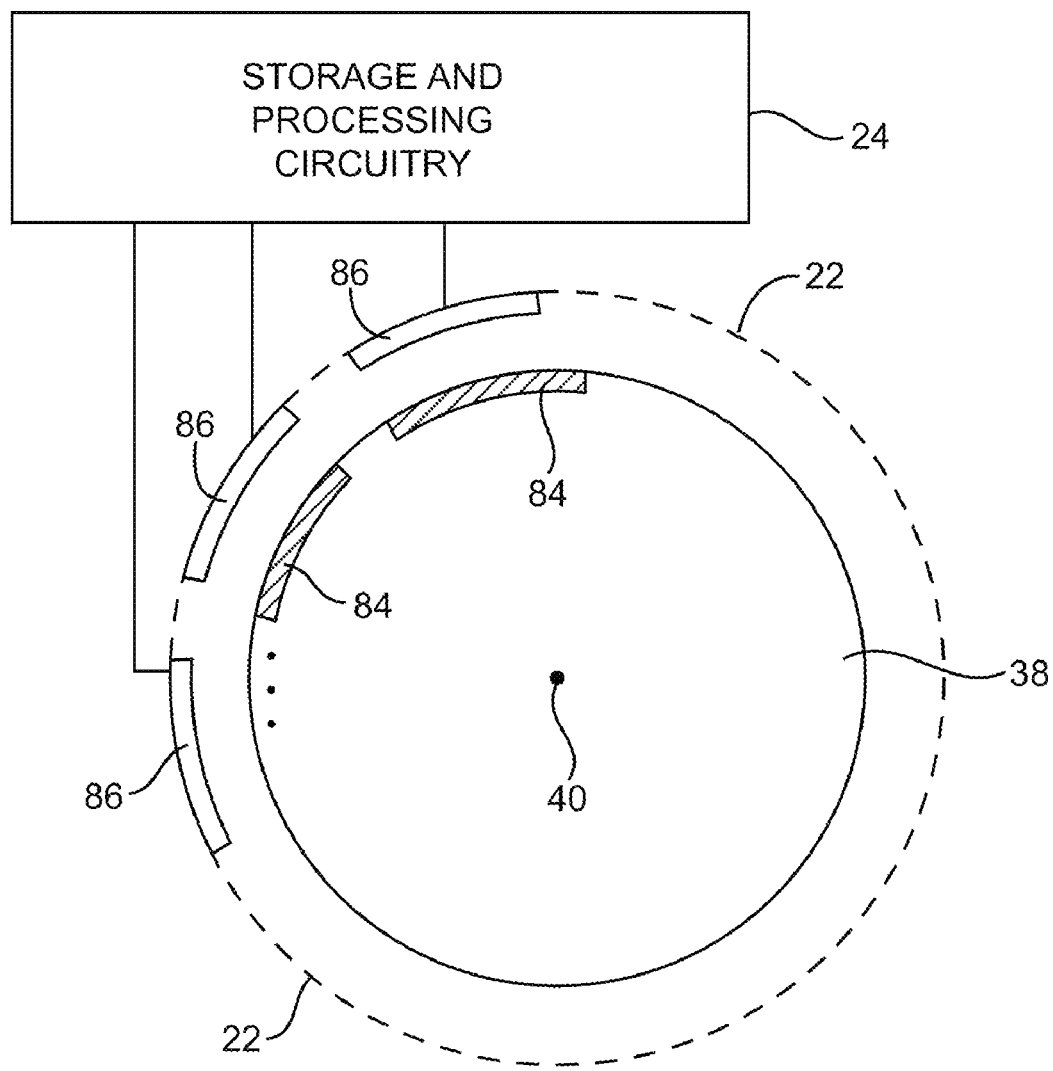
FIG. 8 is a cross-sectional side view of an illustrative capacitive sensor system that may be used in determining the position of an audio plug in accordance with an embodiment of the present invention.

If desired, the position of audio plug 38 may be monitored using capacitive sensors. An illustrative capacitive sensor system is shown in FIG. 8. As shown in FIG. 8, one or more electrodes such as electrodes 86 may be mounted at fixed positions within audio jack 22. Audio plug 38 may include one or more electrodes 84 at different respective angular positions around the periphery of audio plug 38. When an electrode on plug 38 aligns with an electrode on jack 22, measured capacitance will generally peak. When the jack and plug electrodes are not in alignment, measured capacitance will generally drop. Capacitance changes can be measured and processed to determine the rotational orientation of plug 38 about axis 40 using storage and processing circuitry 24.

Figure 9:
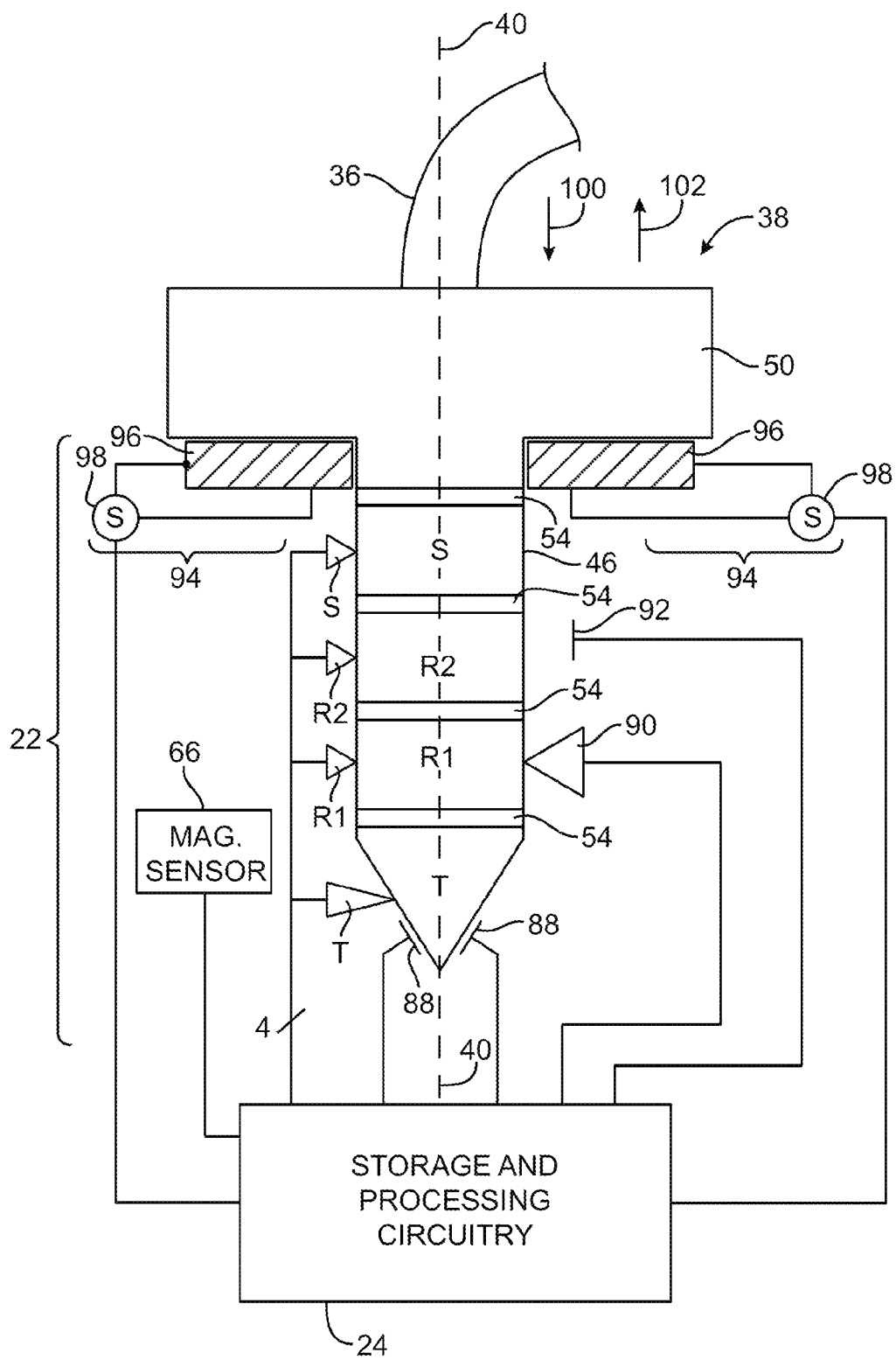
FIG. 9 is a cross-sectional side view of an illustrative audio plug that has been inserted into a corresponding audio jack in an electronic device with sensors for measuring the position of the audio plug in accordance with an embodiment of the present invention.

If desired, capacitance sensors and other sensors may be used in measuring tilt in audio plug 38. An illustrative audio connector control system in which audio plug tilt can be monitored is shown in FIG. 9. In the example of FIG. 9, audio plug 38 has been inserted within audio jack 22, so that tip contact T, ring contacts R1 and R2, and sleeve contact S of plug 38 contact respective contacts T, R1, R2, and S in jack 22. Insertion sensor 90 may be used to determine when audio plug 38 is present.

Capacitive electrodes 88 can be oriented around some or all of the periphery of audio plug 38. There may be, for example, an array of three or four or more than four electrodes 88 that are arranged around plug 38 at respective angular positions. In a three electrode configuration, for example, a first electrode might be centered at an angular position of 0° about axis 40, a second electrode might be centered at an angular position of 120° about axis 40, and a third electrode might be centered at an angular position of 240° about axis 40. Each electrode may monitor about 5-120° of the periphery of plug 38 in this type of configuration.

In the FIG. 9 example, electrodes 88 have been placed adjacent to tip contact T of plug 38. This is merely illustrative. Electrodes 88 may be placed adjacent to other conductive portions of shaft 46 if desired (see, for example, illustrative capacitive electrode 92, which has been placed adjacent to ring contact R2 in audio plug 38).

Optional magnetic sensor 66 or other sensors may be used to make measurements of the rotational orientation and movement of audio plug 38. Because electrodes 88 are evenly spaced and surround all sides of audio plug 38, electrodes 88 can be used to monitor tilt in audio plug 38 relative to audio jack longitudinal axis 40. If, for example, audio plug 38 tilts so that tip T (or other suitable part of shaft 46) moves closer to a first of three electrodes in a three electrode setup while simultaneously moving farther from the second and third electrodes, the capacitance measured with the first electrode will generally rise, while the capacitance measured with the second and third electrodes will generally fall. Storage and processing circuitry 24 can measure the capacitances at each of the electrodes and can use interpolation to determine the direction in which audio plug 38 is tilting with respect to axis 40 and to determine the magnitude of the tilt. This allows audio plug 38 to be used as a joystick in controlling electronic device 10.

Electrodes 88 that are configured as shown in FIG. 9 can detect axial movement of audio plug 38 along axis 40. When plug 38 is moved in inward direction 100, all electrodes 88 will generally exhibit a capacitance increase. When plug 38 is moved outwards (i.e., away from jack 22 and device 10 in direction 102), all electrodes 88 will generally exhibit a capacitance decrease. Inward and outward axial movement of this type may be detected separately from tilt activity or may be measured simultaneously (e.g., if a user is both tilting audio plug 38 and pushing audio plug 38 inwardly at the same time).

Flexible structures in audio jack 22 may be used to allow audio plug 22 to tilt and optionally exhibit axial movement. These flexible structures may be incorporated into contacts S, R1, R2, and T (e.g., by using flexible spring structures), may be incorporated into jack 22 using other springs or flexible metal members, may be implemented using flexible polymers (e.g., flexible gaskets, flexible foam, etc.), or may be implemented using other flexible structures.

If desired, tilt and axial movement of audio plug 38 may be detected using other (non-capacitive) sensors (e.g., piezoelectric sensors, strain gauges based on resistive thin films or surface electrodes, mechanical sensors such as plungers with encoders or other mechanisms that measure position using an array of electrical contacts, resistive sensors, magnetic sensors, optical sensors, etc.). The arrangement of FIG. 9 includes, as an example, resistive sensors 94. There may be any suitable number of resistive sensors 94 (e.g., four sensors 94 arranged at equally distributed angular positions about axis 40 as an example). Each sensor 94 may include a compressible foam member 96 and a resistance (resistivity) sensor 98. Resistance sensors 98 may measure the resistance of each compressible foam member 96 and may supply resistance data to storage and processing circuitry 24 or the resistance measurement functions of sensors 94 may be incorporated into storage and processing circuitry 24.

When audio plug 38 tilts in a particular direction, the foam sensor member 96 that is located along the direction of tilt will tend to be compressed. This will generally decrease its resistance without increasing the resistance of the sensor members elsewhere in the array. Axial movement will result in resistance increases from all sensors 94 in the array at the same time. By processing sensor signals from an array of circumferentially distributed sensors 94, tilt and axial movement can be detected.

Resistive sensors such as sensors 94 can be used in conjunction with capacitive sensors 88 or may be used in place of capacitive sensors. If desired, members 96 may be formed from non-conductive foam or other compressible materials that do not form part of a sensor (e.g., to serve as a flexible gasket that allows audio plug 38 to tilt and reciprocate axially within audio jack 22 without serving as a sensor component). In general, any suitable number of sensor technologies may be used simultaneously. For example, one, some, or all of the sensors described in connection with FIGS. 4, 5, 6, 7, 8, and 9 may be used in an audio connector position sensing system.

FIG. 10 shows how capacitive electrodes 88 may be arranged at evenly spaced angular locations around the inner periphery of audio jack 22 and the outer periphery of audio plug 38. In the FIG. 10 example, there are four capacitive electrodes. Electrode 88A is located at an angular position of 0°, electrode 88B is located at an angular position of 90°, electrode 88C is located at an angular position of 180°, and electrode 88D is located at an angular position of 270°. Storage and processing circuitry 24 can detect movement of audio plug 38 by measuring the capacitance of sensors 88A, 88B, 88C, and 88D.

Consider, as an example, movement (e.g., tilt) in audio plug 38 that causes plug 38 to move in direction 104. In this situation, the capacitance signals that are gathered using electrodes 88C and 88D will increase and the capacitance signals that are gathered using electrodes 88B and 88A will decrease. If, as another example, audio plug 38 tilts so that shaft 46 moves in direction 106, the sensor signal from electrode 88A will increase, the sensor signal from electrode 88C will decrease, and the sensor signals from electrodes 88B and 88D will tend to decrease (e.g., somewhat less than the decrease exhibit by electrode 88C). By examining the pattern of signal changes from electrodes 88 and the magnitude of each of these signal changes, storage and processing circuitry 24 can determine in which direction audio plug 38 has been tilted and by how much audio plug 38 has been tilted.

Figure 11:
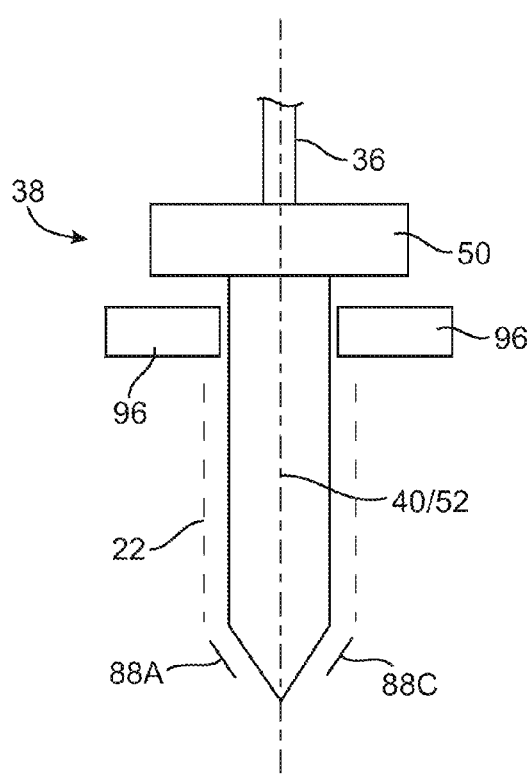
FIG. 11 is a cross-sectional side view of an illustrative audio plug and associated capacitive sensors in a position in which the audio plug is oriented along the longitudinal axis of an audio jack in accordance with an embodiment of the present invention.

FIG. 11 is a side view of audio plug 38 in a configuration in which audio plug 38 has been inserted into audio jack 22. In FIG. 11, audio plug 38 is in an on-axis (untilted) orientation. In this configuration, compressible members 96 are both uncompressed (unflexed) and longitudinal axis 46 of audio plug 38 is aligned with longitudinal axis 40 of FIG. 12.

Figure 12:
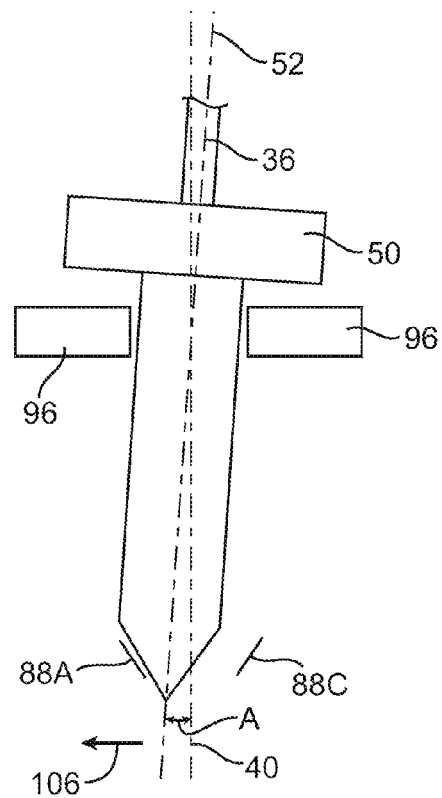
FIG. 12 is a cross-sectional side view of the illustrative audio plug and associated capacitive sensors of FIG. 11 in a position in which the audio plug has been tilted with respect to the longitudinal axis of the audio jack in accordance with an embodiment of the present invention.

A user may tilt or otherwise manipulate audio plug 38 by grasping and moving cable 36 and jacket 50 of audio plug 38. For example, the user may tilt audio plug 38 so that shaft 46 moves in direction 106, as shown in FIG. 12. As described in connection with FIG. 10, storage and processing circuitry 24 may detect the resulting capacitance changes on electrodes 88 (and, if members 96 are being used as movement sensors, the resulting signal changes produced by members 96) and can determine the value of angle A (i.e., the amount by which audio plug longitudinal axis 46 has tilted with respect to audio jack longitudinal axis 40). Storage and processing circuitry 24 can also determine the angular direction of the tilt (i.e., direction 106, which corresponds to an angle of 0° in the FIG. 10 diagram).

Figure 13:
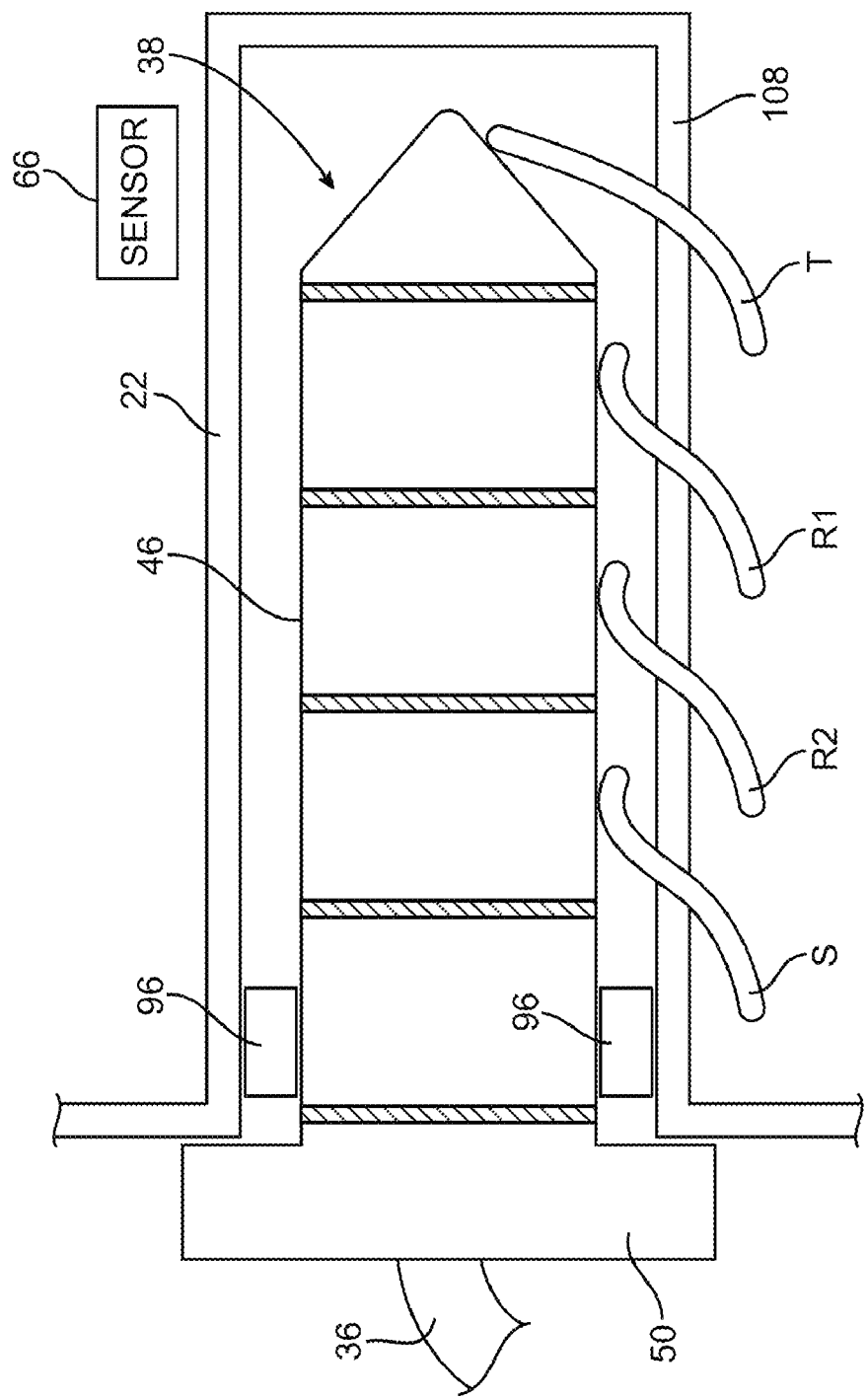
FIG. 13 is a cross-sectional side view of an audio plug inserted into a waterproofed audio jack in accordance with an embodiment of the present invention.

FIG. 13 is a cross-sectional side view of audio plug 38 and audio jack 22 showing how audio jack 22 may be implemented using a waterproof (water-resistant) construction. As shown in FIG. 13, audio jack 22 may be provided with sidewalls 108 that are sealed against the environment, thereby preventing the intrusion of dust or moisture into the interior of device 10. Audio jack contacts T, R1, R2, and S may protrude through sidewall structure 108. Sidewall structure 108 may be sufficiently sealed around the audio jack contacts to prevent moisture from passing from the vicinity of plug 38 to the interior of device 10. Structure 108 may, if desired, be formed from a dielectric such as plastic with a cylindrical opening to receive plug 38. Sensor such as magnetic sensor 66 can be mounted in the interior of device 10, on the protected side of structure 108 (as an example).

Figure 14:
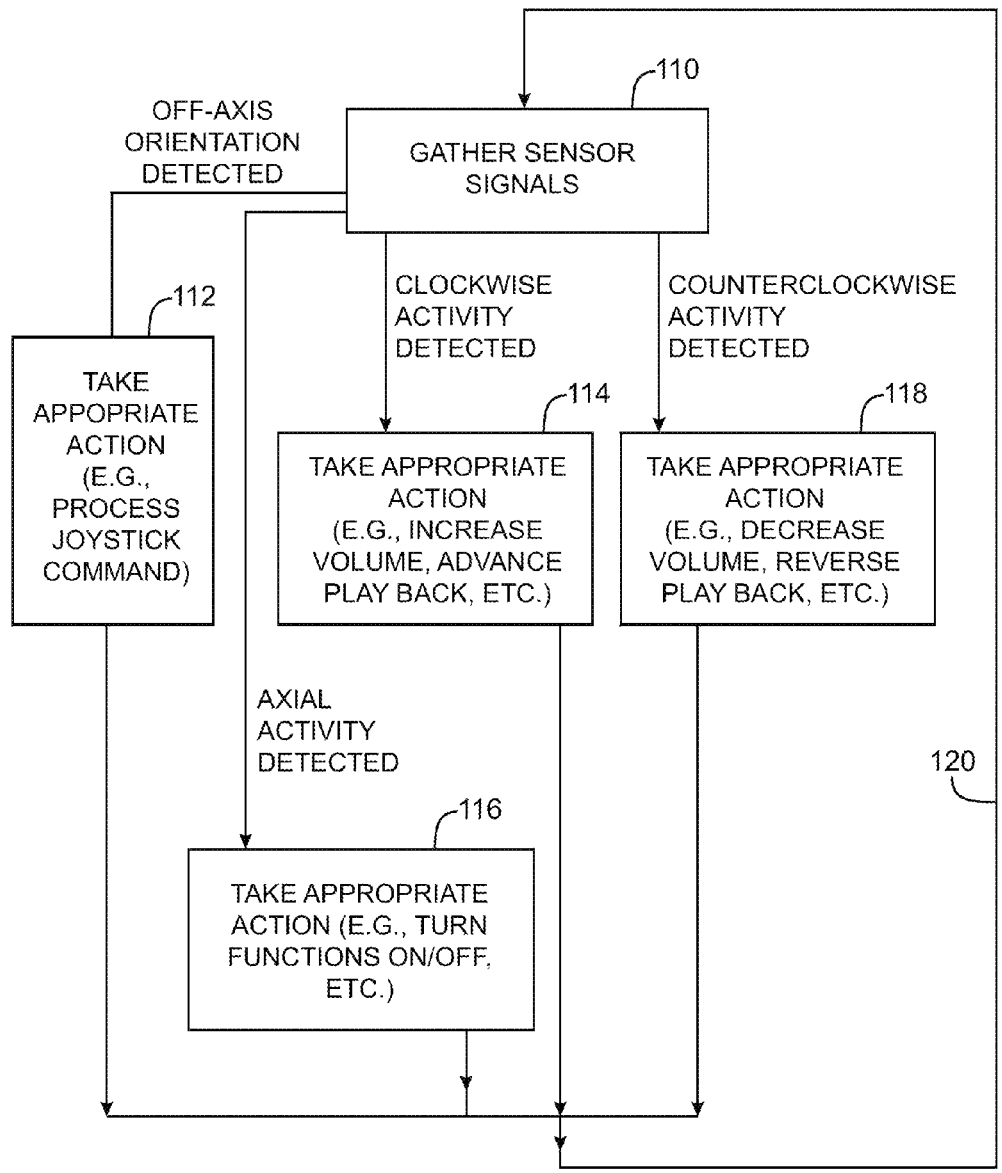
FIG. 14 is a flow chart of illustrative steps involved in operating equipment that includes an audio connector control system in accordance with an embodiment of the present invention.

Illustrative steps involved in operating an electronic device with an audio-contact-based user interface are shown in FIG. 14.

At step 110, sensor structures in device 10 and/or sensor structures in accessory 30 (i.e., in the vicinity of plug 38) may be used to detect user input. As described in connection with FIGS. 4-9, sensors that may be used to detect input include light sensors, magnetic sensors, mechanical sensors, electrical sensors, capacitive sensors, resistive sensors, other sensors, and combinations of these sensors. Rotational activity (angular position and/or angular movement), axial activity (axial position and/or axial movement), and tilting activity (off-axis positioning and/or off-axis movement) can be detected. Storage and processing circuitry 24 may analyze sensor data in real time to detect and quantify user input that involves manipulation of audio plug.

If tilting activity (off-axis orientation activity) is detected, appropriate action may be taken at step 112. For example, storage and processing circuitry 24 can interpret a tilt in audio plug 38 as a command to adjust the position of a pointer on a display, as a command to move through menu items, as a command to control media playback, etc. Tilt activity may, if desired by interpreted as 2-dimensional commands (i.e., X-Y joystick data). Tilt monitoring and processing may therefore be used to implement joystick functionality in device 10.

If axial activity is detected, appropriate actions may be taken at step 116. Examples of actions that can be taken in response to detecting that audio plug 38 has been moved axially along axis 40 include toggling the power state of device 10, and controlling media playback (e.g., pausing or starting playback, making menu selections, etc.).

If clockwise rotational activity is detected, appropriate steps may be taken at step 114. If counterclockwise rotational activity is detected, appropriate actions may be taken at step 118. Examples of actions that may be taken in response to rotational activity include increasing and decreasing media playback volume, making menu selections, controlling media playback, etc.

After detecting activity and taking appropriate action, processing can return to step 110, as indicated by line 120.

During sensor signal processing, audio jack position, audio jack motion, or both position and motion data can be observed and used in determining what actions to take in device 10. Acceleration data and other secondary data can be extracted from position and motion signals and can also be used in determining how to take actions in device 10. Some sensors are well suited to gathering position data (e.g., mechanical sensors such as the roller-wheel sensor of FIG. 6). Other sensors are well suited to gathering motion information. For example, when an magnetic sensor is used to detect rotational activity of a legacy-type magnetless audio plug that does not include a magnet or other registration features, the sensor may be particularly well suited to detecting rotational motion, rather than determining the absolute position of plug 38. Depending on the capabilities of the sensors that are used, some configurations may be best suited to taking actions based on the absolute position of plug 38 and other configurations may be best suited to taking actions based on the speed (and, if desired, acceleration) of plug 38 (e.g., how fast a user is rotating plug 38 in the clockwise or counterclockwise direction). Combinations of these approaches may be used. For example, a magnetic sensor may be used to detect the speed with which plug 38 is rotated, a capacitive sensor array may be used to detect the absolute X-Y position of shaft 46, and the capacitive sensor or a mechanical switch may be used to determine the axial position of plug 38.

The foregoing is merely illustrative of the principles of this invention and various modifications can be made by those skilled in the art without departing from the scope and spirit of the invention.

What is claimed is:

1. An electronic device that is configured to operate with an accessory that has an audio plug, comprising:
   an audio jack; and
   a magnetic sensor that detects rotation of the audio plug when the audio plug is in the audio jack, wherein the magnetic sensor comprises an anisotropic magnetoresistance sensor.

2. The electronic device defined in claim 1 further comprising capacitive sensor electrodes that monitor the audio plug.

3. The electronic device defined in claim 2 wherein the audio jack comprises flexible members that accommodate tilting movement of the audio plug relative to the electronic device.

4. The electronic device defined in claim 3 further comprising:
storage and processing circuitry that is configured to process capacitive sensor signals from the capacitive sensor electrodes to produce joystick data corresponding to the tilting movement of the audio plug.

5. The electronic device defined in claim 1 further comprising flexible members that sense tilting movement of the audio plug relative to the audio jack.

6. The electronic device defined in claim 1 wherein the audio jack includes a tip contact, a sleeve contact, and at least one ring contact.

7. The electronic device defined in claim 1 wherein the audio jack has a longitudinal axis, the electronic device comprising capacitive electrodes that measure tilting movement of the audio plug relative to the longitudinal axis and that measure axial movement of the audio plug along the longitudinal axis.

8. The electronic device defined in claim 7 further comprising sensors with flexible members in the audio jack.

9. An electronic device that is adapted to operate with an accessory that has an audio plug, comprising:
an audio jack; and
capacitive sensors that monitor the audio plug when the audio plug is inserted in the audio jack.

10. The electronic device defined in claim 9 wherein the capacitive sensors comprise an array of capacitor electrodes distributed at different positions around the audio plug.

11. The electronic device defined in claim 10 further comprising a magnetic sensor that detects rotation of the audio plug relative to the audio jack.

12. The electronic device defined in claim 9 further comprising:
at least one flexible structure in the audio jack that allows the audio plug to tilt relative to the electronic device, wherein the capacitive sensors measure the tilt.

13. The electronic device defined in claim 12 wherein the flexible structure comprises part of a resistance sensor.

14. An audio jack that is adapted to receive a magnetless audio plug, comprising:
a tip contact;
at least one ring contact;
a sleeve contact; and
a magnetic sensor that detects rotational motion of the magnetless audio plug relative to the audio jack.

15. The audio jack defined in claim 14 further comprising capacitive sensors that make capacitance measurements on the audio plug.

16. The audio jack defined in claim 14 wherein the audio jack has a longitudinal axis, the audio jack further comprising:
at least one flexible structure that allows the magnetless audio plug to tilt relative to the longitudinal axis.

17. The audio jack defined in claim 16 wherein the flexible structure comprises part of a resistance sensor.

18. The audio jack defined in claim 16 further comprising a sensor that detects axial movement of the magnetless audio plug along the longitudinal axis.

19. The audio jack defined in claim 14 wherein the magnetic sensor comprises an anisotropic magnetoresistance sensor.

\* \* \* \* \*